Jan. 11, 1966  P. K. TRIMBLE  3,228,264
BALANCING MACHINE

Filed April 18, 1963  2 Sheets-Sheet 1

INVENTOR.
Philip K. Trimble
BY
Hugh L. Fisher
ATTORNEY

Jan. 11, 1966 P. K. TRIMBLE 3,228,264
BALANCING MACHINE
Filed April 18, 1963 2 Sheets-Sheet 2

INVENTOR.
Philip K. Trimble
BY
Hugh L. Fisher
ATTORNEY

United States Patent Office
3,228,264
Patented Jan. 11, 1966

3,228,264
BALANCING MACHINE
Philip K. Trimble, Rochester, Mich., assignor to General Motors Corporation, Detroit, Mich., a corporation of Delaware
Filed Apr. 18, 1963, Ser. No. 273,868
11 Claims. (Cl. 77—5)

This invention relates to improvements in balancing machines.

When making unbalance corrections in a workpiece, provision must be made for the lack of a direct relationship between the unbalance removed and the position of the correction device. If for exemplary purposes a drill is used, it will be appreciated that the drill depth and the unbalance removed have no direct mathematical relation. This is because the drill tip does not remove as much material as the main body of the drill and in radial drilling because the radius of the center of gravity of the material removed constantly changes as the drill advances into the workpiece and towards the workpiece rotational axis. Because the unbalance removed is equivalent to the product of the radius of the center of gravity of the material removed and its weight, obviously the greatest correction per unit of drill depth occurs at the peripheral area of the workpiece or that area the greatest distance from the rotational axis of the workpiece. Therefore, it is necessary to introduce a compensating factor into the correction. This has been done in various ways, such as by specially cut cams or followers that control drill movement and by the use of nonlinear scales on meters or drill depth gages. The cams and followers are expensive and offer no flexibility since each time either the shape of the workpiece or the shape of the drill, e.g., the cone tip or the drill diameter, is changed, a new cam or follower must be provided. Of course, the meters and the gages require manual operation.

To overcome the foregoing problem, a balancing machine is proposed that has a novel unbalance correction provision. By the invention, this unbalance correction provision introduces into the correction a factor that is a function of the radius of the center of gravity of the material removed from the workpiece and the weight of this material removed, thus permitting in effect the movements of a correction device and the unbalance removed to be directly compared.

More specifically stated, the invention provides for automatic unbalance correction by developing an unbalance voltage and a correction device movement voltage reflecting respectively the amount of unbalance in the workpiece and the movements of the correction device relative to the workpiece. One of these voltages is changed by a voltage proportioning network according to a certain scheme. Specifically, a compensating factor is developed that is a function of the weight of the mass altered and the radius of the center of gravity of the mass altered. Thereafter, the changed voltage can be directly compared with the unchanged voltage and an error voltage produced for controlling the device's movements.

In the foregoing unbalance correction provision, the operation should desirably be commenced when the correction device has a certain positional relationship with the workpiece. If the correction device must be moved to this certain positional relationship, there is an additional requirement that the correction device always commence movement from the same position so as to not give a false compensation. This would be particularly true when a cam or follower was utilized because the point at which the correction device, e.g., a drill started to advance would be very critical. This resetting of the drill and accurate commencement of its advance is subject to variations many of which can reduce the accuracy of the unbalance correction.

Therefore, it is further contemplated by the invention to incorporate in the unbalance correction provision a unique way of rendering inconsequential the point at which relative movement between the workpiece and the correction device commences. Therefore, this point is no longer a problem; in fact, it is immaterial. By this proposal and according to the invention, an adjustment is made automatically at the time actual unbalance correction is initiated for the commencement of the relative movement of the correction device and workpiece so as as to not influence the correction factor developed.

The foregoing and other objects and advantages of the invention will be apparent from the following description and from the accompanying drawings in which.

Figure 1:
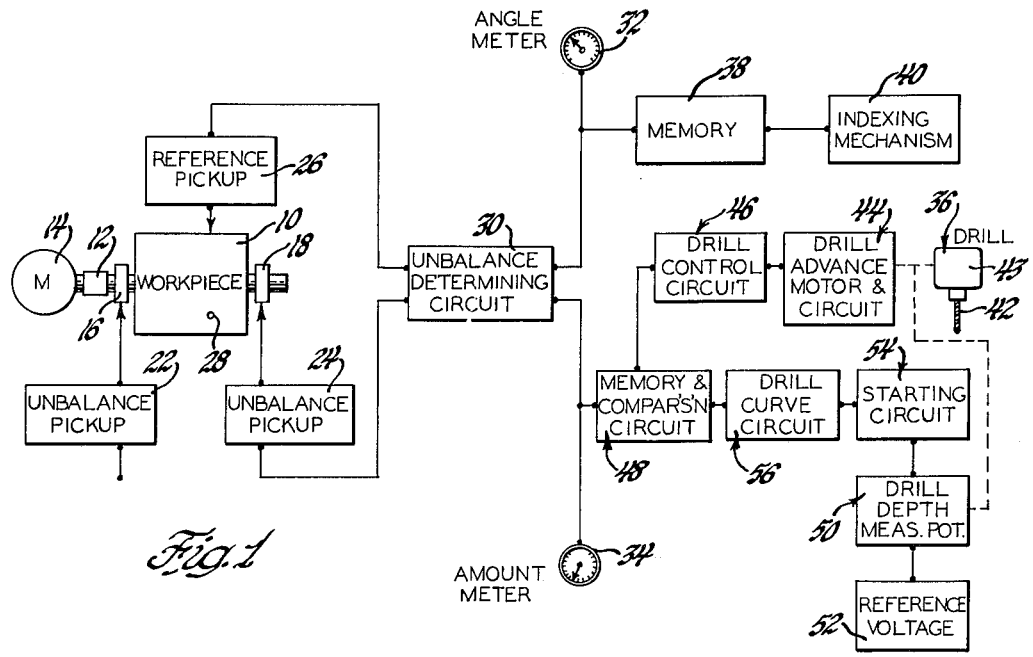
FIGURE 1 is a block diagram of one embodiment of the invention involving the correction of the drill depth voltage.

Referring now to FIGURE 1, the numeral 10 designates generally a workpiece, which is to be balanced. The workpiece 10 is suitably connected by a coupling 12 to a motor 14. The motor 14 is of any known type capable of revolving the workpiece 10 at a speed necessary for determining the unbalance characteristics of the workpiece 10. The workpiece 10 is at its ends mounted in appropriate bearing supports 16 and 18. Unbalance pickups 22 and 24 of any known type, e.g., magnetically or capacitively operated, cooperate respectively with the supports 16 and 18 to develop outputs characterizing the unbalance at each of these bearing supports 16 and 18. A reference pickup 26 of the same general character as the unbalance pickups 22 and 24 provides a reference or sync voltage of a frequency corresponding to the rate at which a reference point 28 on the workpiece 10 passes the reference pickup 26. The reference point 28 may be a hole, a magnetic slug, or some other type of mark such that the reference pickup 26 will respond and produce an impulse each time the mark passes it.

The outputs of the unbalance pickup 24 and the reference pickup 26 are each connected to the input of an unbalance determining circuit denoted generally at 30. The unbalance determining circuit 30 may be of any known kind that will develop output signals or voltages indicating the amount of unbalance in the plane of the bearing supports 16 and 18 and the location of the unbalance relative to the reference point 28. Such a circuit is disclosed in the United States application S.N. 235,380 to Trimble, filed November 5, 1962. Because of this prior disclosure, it is only mentioned here that the output voltage from the unbalance pickup 24 is sine wave shaped and has an amplitude representing the actual amount of unbalance. In the unbalance determining circuit 30, the phases of the reference pickup output voltage and the unbalance pickup output voltage are compared; then the reference pickup output voltage is used to produce a new reference voltage, which is shifted until in phase with the output voltage from the unbalance pickup 24. An angle voltage corresponding to the amount of this phase shift can be directly read on a conventional angle meter 32 and indicates the angular disposition of the unbalance relative to the reference point 28. Also, the unbalance determining circuit 30 utilizes the phase shifted reference signal to synchronously rectify the output voltage from the unbalance pickup 24 so that a D.C. unbalance voltage is developed that reflects the amount of the unbalance. The unbalance voltage can be read on a suitable amount meter 34 that will respond to this D.C. unbalance voltage.

The unbalance voltage is as will become apparent used to operate an unbalance correction device such as a drill shown generally at 36, whereas the angle voltage is initially stored by a memory 38 and thereafter utilized when needed to operate an indexing mechanism 40. The indexing mechanism 40 is of any appropriate type that can be used to revolve the workpiece 10 until the heavy part of the workpiece 10 or the point at which the unbalance is located is positioned opposite the drill 36. The drill 36 will then remove the proper amount of material as determined by the unbalance voltage to correct for this unbalance.

Briefly describing at this point the actual unbalance correction apparatus, the drill 36 includes a drill bit 42 with the customary conical tip and a motor 43 for revolving the drill bit 42. The advancing and retracting movements of the drill bit 42 are under the control of a drill advance motor and circuit 44, which in turn is controlled by a drill control circuit 46. The drill control circuit 46 is connected to the output of a memory and comparison circuit 48. This memory and comparison circuit 48 stores the unbalance voltage from the unbalance determining circuit 30 until needed. The same memory and comparison circuit 48 receives a drill depth voltage, which it algebraically compares with the unbalance voltage. Any difference from the comparison results in an error voltage that is utilized by the drill control circuit 46 to operate the drill advance motor 44 so that the drill bit 42 is fed the proper depth into the workpiece for removing the unbalance.

The drill depth voltage is developed by a drill depth measuring potentiometer 50, which is sensitive to the movements of the drill bit 42, and a reference voltage source 52. The drill depth voltage so generated is initially employed by a starting circuit 54 to commence the unbalance correction operation and is thereafter altered in a drill curve circuit 56, the function of which is to introduce compensating factors according to a certain scheme into the drill depth voltage before applying the resulting drill depth voltage to the memory and comparison circuit 48. The latter drill curve circuit 56 as well as the starting circuit 54 will be next explained in greater detail.

Figure 2:
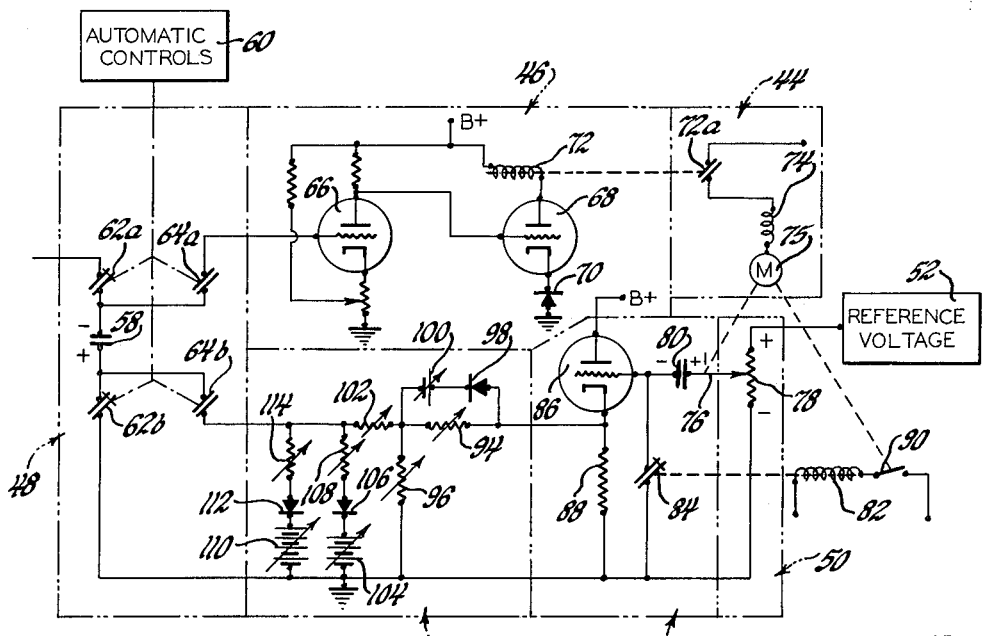
FIGURE 2 is a detailed circuit diagram of the unbalance correction apparatus illustrated in FIGURE 1.

Considering now the FIGURE 2 schematic diagram, as illustrated, the memory and comparison circuit 48 preferably includes a memory condenser 58, which may be arranged according to the indicated polarity. The condenser 58 may either provide memory or comparison functions. The determination of which function is to be provided is made by appropriate automatic controls shown generally at 60. These controls 60 operate normally closed contacts 62a and 63b and normally open contacts 64a and 64b. When the contacts 62a and 62b are opened, the condenser 58 serves as a memory by storing the unbalance voltage, which was supplied thereto when interposed between ground and the unbalance determining circuit 30. With contacts 62a and 62b open and contacts 64a and 64b closed, the condenser 58 functions as a comparison or summing circuit while still serving as a memory and algebraically adds the unbalance voltage stored thereon and the corrected drill depth voltage applied to the positive side of the condenser 58.

To explain the comparison or summing function of the condenser 58, it will be assumed that the unbalance voltage is a −4 volts and the corrected drill depth voltage is a +1 volt. These values are for exemplary purposes only. The algebraic sum of these two voltages constitutes an error voltage of a −3 volts and is transferred to the drill control circuit 46.

In the drill control circuit 46 depicted in detail in FIGURE 2, the error voltage of −3 volts is applied to the grid of a triode type tube 66. As a result, the plate voltage of the tube 66 is more positive than when the error voltage is null and is applied to the grid of another triode type tube 68. Preferably, the cathode of the tube 68 is grounded through a zener diode 70. The zener diode 70 permits the cathode voltage to remain at a positive potential so that a positive grid voltage can be employed without saturating the tube 68. In other words, the grid voltage can be positive but still negative relative to the cathode voltage. Consequently, this applied positive grid voltage from the plate of the tube 66 will, as preferred, increase or start the conduction of the tube 68. Keeping in mind that this applied positive grid voltage will be maximum when the tube 66 is cut off, an increase in the conduction of the tube 68 will energize a relay 72 in the plate circuit thereof. The amount of the conduction by the tubes 66 and 68 and when they conduct will, of course, be determined by the use of the apparatus as those versed in the art will understand.

The relay 72 controls a pair of normally open contacts 72a in the drill advance motor circuit 44 and when closed energize a winding 74. When the winding 74 is energized, a drill advance motor 75 will through any suitable mechanical connection with the drill 36 cause the drill bit 42 to be advanced towards the workpiece 10.

Advancing and retracting movements of the drill 36 and particularly of the drill bit 42 change the setting of the drill bit 42 relative to the workpiece 10 and accordingly change the setting of the drill depth potentiometer 50. This is accomplished by having a suitable connection made between an adjustable slider arm 76 for the potentiometer 50 and the drill 36. A resistive part 78 of the potentiometer 50 has the upper end connected to the positive side of the reference voltage source 52 and the lower end grounded. Assuming that the slider arm 76 starts at the grounded side of the resistive part 78 and moves upwardly as the drill bit 42 is fed towards the workpiece 10, an increasing positive voltage will be taken off the slider arm 76 as the drill bit 42 advances.

As has been mentioned, the point along the resistive part 78 where the slider arm 76 starts to move upwardly can be very critical. For instance, if allowed to vary, the slider arm 76 may at one time start at a +1 volt and at another time at a +½ volt. As will be explained, this variation will influence the amount of the error voltage and correspondingly the amount that the drill bit 42 is fed by the drill advance motor 75. To overcome this problem, a starting condenser 80 is arranged in series with the slider arm 76 as illustrated in FIGURE 2 and with the designated polarity assuming that the resistive part 78 has the aforementioned polarities. This starting condenser 80 is initially grounded through the operation of a starting relay 82 and its normally closed contacts 84, which connect the negative side of the starting condenser 80 to ground. When the normally closed contacts 84 are opened, the starting condenser 80 becomes in series instead of in parallel with the potentiometer resistive part 78. Therefore, the voltage across the starting condenser 80 exactly equals the potential from the slider arm 78 to ground but is of the opposite polarity. A resultant zero voltage is applied to the grid of a cathode follower tube 86 which also constitutes a part of the starting circuit 54. The cathode follower tube 86 is conductive with a zero grid voltage and a fixed output voltage appears across a cathode resistor 88.

At any convenient position of the drill bit 42 relative to the periphery of the workpiece 10, the advance of the drill 36 can be automatically initiated and the slider arm 76 will start to move upwardly along the resistive part 78. Then, as the drill bit tip 42 touches the workpiece 10, a starting switch 90 suitably connected with the drill advance motor 75 and correspondingly with the drill bit 42, will be closed; the starting relay 82 therefore energized, and the normally closed starting contacts 84 opened. The starting condenser 80 is now no longer grounded and retains its charge, whatever it may be, due to the grid circuit of the cathode follower tube 86 presenting nearly an infinite resistance. To explain further, if the slider arm 76 had been in the $+\frac{1}{2}$ volt position at the time the starting switch 90 was closed, the starting condenser 80 would have applied thereto and retain a $-\frac{1}{2}$ volt charge, or if the slider arm 76 had been at a $+1$ volt position, the starting condenser 80 would have a $-1$ volt charge; and similarly, if the starting switch 90 was closed when the slider arm 76 was at the $+2$ volts position, the starting condenser 80 would be charged to a $-2$ volts.

As the drill bit 42 moves into the workpiece 10, the slider arm 76 will move to an increased voltage position. If the slider arm 76 had been at the $+2$ volts position at the time when the starting switch 90 was closed, the starting condenser 80 would have been charged to a $-2$ volts and the grid voltage on the cathode follower tube 86 would be as mentioned zero. At the $+3$ volts position of the slider arm 76 and with the starting condenser voltage constant at $-2$ volts, the algebraic sum or $+1$ volt will be applied to the grid of the cathode follower tube 86 and a corresponding increase in the output drill depth voltage will occur across the cathode resistor 88. At the $+4$ volts position of the slider arm, the grid voltage will be $+2$ volts, keeping in mind that the starting condenser 80 will still be at a constant $-2$ volts. Hence, the drill depth voltage taken across the cathode resistor 88 will reflect this increase in the potentiometer voltage in a positive direction and in a direct proportion thereto.

Because the drill tip on the drill bit 42 is conical, initial travel of the drill bit 42 into the workpiece 10 will remove less material than the full diameter part of the drill bit 42. Therefore, the unbalance corrected is not linearly related to the drill depth. Moreover, because the unbalance corrected is equivalent to the product of the weight of the material removed by the drill bit 42 and the radius of the center gravity of the material removed, it can be appreciated that if the drill bit 42 is advancing radially inwardly towards the rotational axis of the workpiece 10, the correction is constantly changing, further interfering with any established linear relationship between the unbalance correction and the depth of drilling. It is, therefore, necessary, if automatic correction is to be achieved to compensate for these variables. This is the function of the drill curve circuit 56, which is as explained interposed between the memory and comparison circuit 48 and the starting circuit 54. In the circuit 56 the output drill depth voltage taken across the cathode resistor 88 in starting circuit 54 is altered by factors that will permit a direct comparison to be made between the resulting drill depth voltage and the unbalance voltage. These factors can be derived from a typical drill curve such as that denoted at 92 in FIGURE 5.

Figure 5:
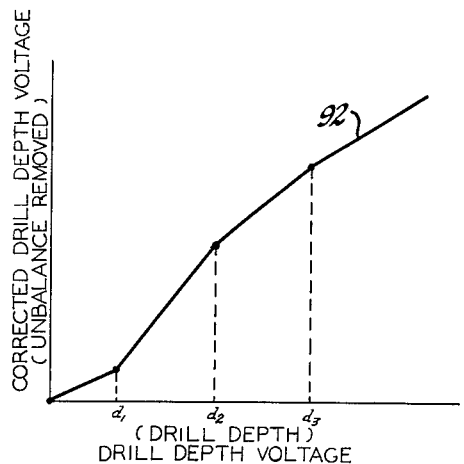
FIGURES 5 and 6 are graphs showing the curves developed respectively in the FIGURE 1 and the FIGURE 3 embodiment.

Referring to the drill curve 92 in FIGURE 5, as illustrated, the tip of the drill bit 42 in advancing into the workpiece 10 up to the distance $d_1$ only removes a small amount of material. Hence, only a small part of the unbalance is removed. From the distance $d_1$ to the distance $d_2$ the main body of the drill bit 42 removes a substantially greater amount of material and therefore the unbalance correction is greater as evidenced by the increased slope of the drill curve 92. If these drill depth and unbalance values are considered voltages or proportional to the voltages, it can be seen that either the drill depth voltage or the unbalance voltage must be corrected. In the FIGURE 1 embodiment, the drill depth voltage is attenuated by the drill curve circuit 56, specifically by the voltage proportioning obtained through resistive elements and biased diodes or the equivalent so as to provide a corrected drill depth voltage according to the desired scheme reflected by the FIGURE 5 curve 92.

Considering the drill curve circuit 56 seen in FIGURE 2, initially the drill depth voltage from the starting circuit 54 is attenuated by resistors 94 and 96, the factor of correction being considerable as can be observed from the curve 92. This is when the tip of the drill bit 42 is advancing into the workpiece 10.

At a drill depth voltage corresponding to the distance $d_1$ in FIGURE 5, a diode 98 reversed bias by a voltage source, such as battery 100, commences to conduct and shunts the resistor 94. The diode 98 of course affords only a small forward resistance to the current flow at this time. If the load resistance is considered infinite, the input drill depth voltage from the cathode resistor 88 appears across the resistor 96 and there is no current flow through an output resistor 102. Therefore, as the drill depth increases from the depth $d_1$ towards depth $d_2$, the corrected drill depth voltage is permitted to increase at approximately the same rate as the input drill depth voltage being derived from the starting circuit 54 there being little or no correction factor needed. This explains why the curve 92 is steeper from distances $d_1$ to $d_2$.

At the distance $d_2$, it can be assumed that the material removed by drill bit 42 is now affording less unbalance correction because the drill bit 42 is approaching closer to the axis of rotation of the workpiece 10. Consequently, the input drill depth voltage from the starting circuit 54 must be slightly reduced or the curve 92 made less steep. This is accomplished by adjusting the bias voltage from another battery 104 to approximate the value of the input drill depth voltage at the distance $d_2$ so that a diode 106 will commence to conduct and resistors 102 and 108 will become effective as voltage dividers. The corrected drill depth voltage will at this time increase at the corresponding rate.

At distance $d_3$ and with the tip of the drill bit 42 even closer to the rotational axis of the workpiece 10, the slope of the curve 92 must be further decreased. Accordingly, the input drill depth voltage at $d_3$ will exceed the reverse bias voltage from another battery 110 and a diode 112 will start to conduct. The input drill depth voltage will be proportioned by a voltage divider comprising resistors 102 and 108 and the additional resistance from a resistor 114. The corrected drill depth voltage will now increase at this new rate.

By having all the different resistors 94, 96, 102, 108, and 114 and the voltage sources 100, 104 and 110 all adjustable, any drill curve for different size drills or for different shaped workpieces can be reproduced merely by making the necessary adjustments. This affords a substantial amount of flexibility. Moreover, if needed, more points along a drill curve can be plotted by providing additional biased diodes. By this provision, any type drill curve can be reproduced.

Briefly summarizing the operation of the FIGURE 1 embodiment, the workpiece 10 is revolved at the speed for determining dynamic unbalance or if desired static unbalance, whereupon the unbalance pickup 24 and the reference pickup 26 become effective to provide the unbalance determining circuit 30 with the necessary information for developing in the aforementioned way the angle and the unbalance voltages. The angle voltage is employed by the memory 38 and the indexing mechanism 40 to properly position the workpiece 10 relative to the drill 36, whereas the unbalance voltage is stored by the memory and comparison circuit 48. After the workpiece 10 is indexed, the automatic control 60 can be so arranged that the drill 36, which will have been retracted, can start to advance and move therewith the slider arm 76 of the drill depth measuring potentiometer 50. The point at which this starts and the point at which the slider arm 76 is relative to the resistive part 78 is not of any consequence as has been explained, assuming of course that there is enough length of the resistive part 78 to produce a null error voltage. At the instant the tip of the drill bit 42 contacts the workpiece 10, the starting switch 90 to closed and the charge voltage on the starting condenser 80 is retained due to the opening of the normally closed contacts 84. The voltage from across the resistor 88 in the cathode circuit to the cathode follower tube 86 represents the actual drill depth and must be corrected by the drill curve circuit 56. These correction factors are introduced in the proportioning network at distances $d_1$, $d_2$ and $d_3$ such that the corrected drill depth voltage at distance $d_1$ is substantially less than the true drill depth voltage. Then from distances $d_1$ to $d_2$ the corrected drill depth voltage closely approximates true depth voltage. At the distances from $d_2$ to $d_3$, and $d_3$ onward, the corrected drill depth voltage is less than the true drill depth voltage because the tip of the drill bit 42 is closer to the rotational axis of the workpiece 10.

At the time when the drill 36 advances, the automatic controls 60 will have altered the illustrated status of the different contacts 62a, 62b, and 64a and 64b, such that the condenser 58 changes from a memory and to a comparing circuit. As a comparing or summing circuit, the corrected drill depth voltages are continuously compared with the unbalance voltage and the algebraic sum, which is the error voltage, is applied to the grid of the tube 66. Because of the action of the zener diode 70 in the cathode of the triode 68, a positive going error voltage, which results when the error voltage is approaching null, causes the plate voltage of the triode tube 66 to become more negative, and accordingly the voltage applied to the grid of the triode tube 68 until a point is reached where the tube 68 will approach cut off and the relay 72 deenergizes. This causes the normally open contacts 72a to open and the motor winding 74 to be deenergized, and accordingly the drill advance motor 75 to stop the advance of the drill bit 42. This completes the unbalance correction and the automatic controls 60 can in a suitable way cause the drill 36 to retract the drill bit 42 to an inoperative position, allowing the workpiece 10 to be removed or an unbalance correction to be made in the left plane if the workpiece 10 is to be dynamically balanced. The correction in the left plane can be accomplished with the information derived from the unbalance pickup 22, which may have its output utilized in the same way as the output from the unbalance pickup 24.

Figure 3:
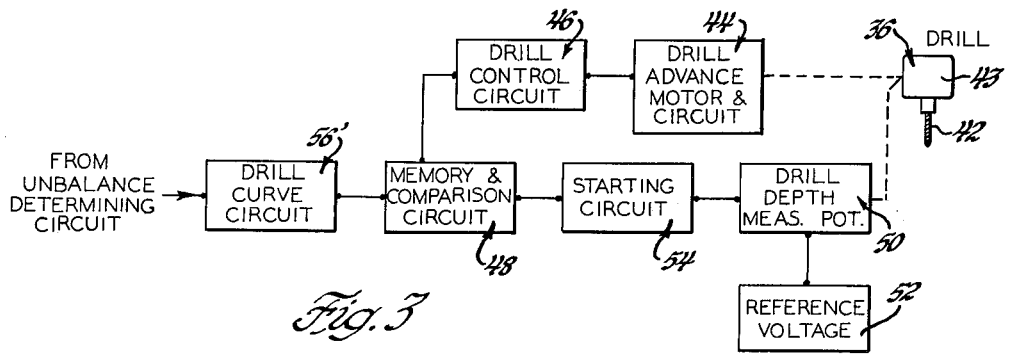
FIGURE 3 is a block diagram of an alternative embodiment of the invention wherein the unbalance voltage is corrected.
Figure 4:
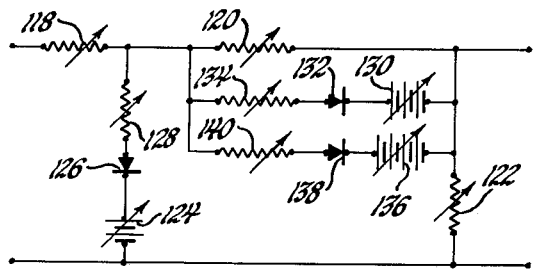
FIGURE 4 is a circuit diagram of the drill curve circuit in FIGURE 3.
Figure 6:
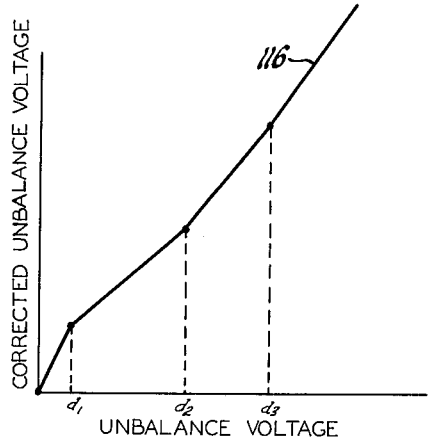

In the FIGURE 3 embodiment, a change is made that permits the unbalance voltage to be corrected instead of the drill depth voltage. To do this, a drill curve circuit, designated generally by the numeral 56', is interposed between the output of the unbalance determining circuit 30 and the memory and comparison circuit 48. The other parts of the FIGURE 3 embodiment are the same as those in the FIGURE 1 and hence, have the same numerals. The details of the drill curve circuit 56' are shown in FIGURE 4 and the curve involved is denoted in FIGURE 6 by the numeral 116.

As can be appreciated from referring to the curve 116, at drill depth distances $d_1$, $d_2$, and $d_3$, the unbalance voltage must be corrected according to a slightly different scheme At drill depths up to the distance $d_1$, the true unbalance voltage must have minimum attenuation. This is because the unbalance removed per unit of drill depth by the drill tip is smaller than that of the body of the drill. Accordingly, the unbalance voltage must have this minimum attenuation. Therefore, the unbalance voltage is proportioned by resistors 118, 120, and 122 to provide the corrected unbalance voltage.

At the distance $d_1$ and to the distance $d_2$, the unbalance voltage must be attenuated to a maximum extent because the amount of unbalance removed per unit of drill depth is also a maximum. As a result, the reverse bias from a battery 124 is exceeded by the input unbalance voltage and a diode 126 starts to conduct. The voltage division now is achieved by resistors 118 and 128 along with the resistors 120 and 122.

At the distance $d_2$, the curve 116 must increase in slope and therefore the attenuation of the unbalance voltage should be decreased. The reason for this is that to remove a given amount of unbalance, the depth of drilling must be increased as the drill approaches the rotational axis of workpiece 10 and the radius of the removed mass is decreasing. This requires compensation by decreasing the attenuation. To do this, the unbalance voltage at the distance $d_2$ exceeds the bias voltage from another battery 130 so that the diode 132 conducts and the voltage proportioning from an additional resistor 134 is introduced into the unbalance voltage.

Continuing the advance of the drill bit 42, at distance $d_3$, attenuation of the input unbalance voltage must be further decreased. This is accomplished due to the bias voltage from the battery 136 being exceeded, such that a diode 138 conducts, introducing the resistor 140 into the voltage proportioning.

Again, additional biased diodes or the equivalent can be employed to simulate whatever drill curve is needed. The corrected unbalance voltage developed according to the desired scheme reflected by the FIGURE 6 curve 116 is now compared in the memory and comparison circuit 48 in the foregoing way but with the true drill depth voltage. The error voltage will be exactly as that produced in the FIGURE 1 embodiment.

From the foregoing, it can now be appreciated that the drill curve circuits 56 and 56' permit any drill curve to be reproduced and with relative ease since this involves merely adjusting resistors and voltage sources. This further facilitates the use of the machine for different workpieces and different drill diameters. Moreover, great accuracy is not needed in starting drill traverse, as this has been explained relative to the starting circuit 54. The starting condenser 80 charges to a constant voltage and thereafter does not influence or alter the output from the cathode follower 86.

Although the unbalance correction device is shown in the form of a drill, as will occur to those versed in the art, the principles of this invention can be incorporated in other type devices, which either remove or add material to the workpiece.

The invention is to be limited only by the following claims.

What is claimed is:

1. In a balancing machine, the combination of means determining the amount of unbalance in a workpiece and developing a corresponding unbalance signal, means correcting for such unbalance, the correcting means including a movable correction device for alterating the mass of the workpiece, means responsive to the device's movements and developing a corresponding device movement signal, means altering one of the signals according to a certain scheme so that the resulting signal can be directly compared with the other signal, means comparing the resultant signal and the other signal and developing therefrom an error signal, and means controlling the device's movements in accordance with the error signal so as to alter the mass the workpiece in accordance therewith and thereby correct for such unbalance.

2. In a balancing machine, the combination of means determining the amount of unbalance in a workpiece and developing a corresponding unbalance signal, unbalance correcting means including a movable correction device positioned proximate to the workpiece for altering the mass thereof, means responsive to the device's movements and operative to produce a corresponding device movement signal, means rendering the means responsive to the device's movements operative when a certain positional relationship between the device and the workpiece exists, means altering one of the signals according to a certain scheme so that the resulting signal can be directly compared with the other signal, the altering means including a signal proportioning network, means comparing the resulting signal and the other signal and developing therefrom an error signal, and means controlling the device's movements in accordance with the error signal so as to alter the mass of the workpiece in accordance therewith and thereby correct for such unbalance.

3. In a balancing machine, the combination of means determining the amount of unbalance in a workpiece and developing a corresponding unbalance signal and unbalance correcting means including a movable correction device positioned proximate to the workpiece for altering the mass thereof, means responsive to the device's movements including an energy source having the output thereof variable according to the device's movement for producing a corresponding device movement signal, means starting operation of the means responsive to the device's movements when a certain positional relationship exists between the device and the workpiece, the starting means including means adjusting the output from the source at the certain positional relationship so as to compensate for the commencement of the device's movements at different relative positions of the device and the workpiece, means introducing into one of the signals a compensating factor that is a function of both the radius of the center of gravity of the mass altered and the weight of the mass altered so that the resulting signal can be directly compared with the other signal, the introducing means including a signal proportioning network, means comparing the resulting signal and the other signal and developing therefrom an error signal, and means controlling the device's movements in accordance with the error signal so as to alter the mass of the workpiece in accordance therewith and thereby correct for such unbalance.

4. In a balancing machine, the combination of means determining the amount of unbalance in a workpiece and developing a corresponding unbalance voltage, unbalance correcting means including a movable drill positioned proximate to the workpiece for removing material therefrom, means responsive to the drill movements for producing a corresponding drill depth voltage, means altering the drill depth voltage according to a certain scheme so that the resulting drill depth voltage can be algebraically compared with the unbalance voltage, the altering means including a voltage proportioning network, means comparing the resulting drill depth voltage and the unbalance voltage and developing therefrom an error voltage, and means controlling the drill movements in accordance with the error voltage so as to remove material from the workpiece in accordance therewith and thereby correct for such unbalance.

5. In a balancing machine, the combination of means determining the amount of unbalance in a workpiece and developing a corresponding unbalance voltage, unbalance correcting means including a movable drill positioned proximate to the workpiece for removing material therefrom, means responsive to the drill movements for producing a corresponding drill depth voltage, means altering the unbalance voltage according to a certain scheme so that the resulting unbalance voltage can be algebraically compared with the drill depth voltage, the altering means including a voltage proportioning network, means algebraically comparing the resulting unbalance signal voltage and the drill depth voltage and developing therefrom an error voltage reflecting the algebraic sum thereof, and means controlling the drill movements in accordance with the error voltage so as to remove material from the workpiece in accordance therewith and thereby correct for such unbalance.

6. In a balancing machine, the combination of means determining the amount of unbalance in a workpiece, means correcting for such unbalance, the correcting means including a movable correction device positioned proximate to the workpiece and operative to alter the mass of the workpiece, means maneuvering the correction device and the workpiece relative to each other from different initial relative settings and means starting operation of the correction means when a certain positional relationship exists between the correction device and the workpiece, the starting means including means adjusting for the different initial relative settings.

7. In a balancing machine, the combination of means determining the amount of unbalance in a workpiece and developing a corresponding unbalance signal, unbalance correcting means including a movable drill positioned proximate to the workpiece for removing material therefrom, means responsive to the drill movements for producing a corresponding drill depth voltage, means altering one of the signals according to a certain scheme so that the resulting voltage can be directly compared with the other voltage, the altering means including a voltage proportioning network comprising a biased element for causing the one voltage to be altered by a factor reflecting both the radius of the center of gravity of the material removed and the weight of the material removed, means comparing the resulting voltage with the other voltage and developing therefrom an error voltage, and means controlling the drill movements in accordance with the error voltage so as to remove material from the workpiece in accordance therewith and thereby correct for such unbalance.

8. In a balancing machine, the combination of means determining the amount of unbalance in a workpiece and developing a corresponding unbalance voltage, unbalance correcting means including a movable drill positioned proximate to the workpiece for removing material therefrom, means responsive to the drill movements and including a voltage source having the output thereof variable according to drill position so as to develop a corresponding drill depth voltage, means starting operation of the means responsive to the drill movements when a certain positional relationship exists between the drill and the workpiece, the starting means including means adjusting the output from the source at the certain positional relationship so as to compensate for the commencement of drill movements at different relative positions of the drill and the workpiece, means altering one of the voltages according to a certain scheme so that the resulting voltage can be algebraically summed with the other voltage, the altering means including a voltage proportioning network comprising a resistive element and a biased diode so arranged as to alter the one voltage by a factor that is the function of both the radius of the center of gravity of the material removed from the workpiece and the weight of the material removed, means summing the resulting voltage and the other voltage and developing therefrom an error voltage, and means controlling the drill movements in accordance with the error voltage so as to remove material from the workpiece in accordance therewith and thereby correct for such unbalance.

9. In a balancing machine, the combination of means determining the amount of unbalance in a workpiece and developing a corresponding unbalance voltage, unbalance correcting means including a movable drill positioned at an initial setting proximate to the workpiece and operative to remove material therefrom, means responsive to the drill movements and including the voltage source and a variable potentiometer operatively connected to the drill so as to alter the voltage from the source in accordance with drill position and develop a corresponding output drill depth voltage, means altering the drill depth voltage so that the unbalance voltage and the resulting drill depth voltage can be algebraically summed, the altering means including a voltage proportioning network comprising a series of resistive elements and biased diodes so arranged as to alter the drill depth voltage by factors that are the function of both the radius of the center of gravity of the material removed and the weight of the material removed, starting means connecting the potentiometer to the altering means when a certain positional relationship exists between the drill and the workpiece, the starting means including means adjusting for different initial settings of the drill, means summing the resulting drill depth and unbalance signal voltages and developing therefrom an error voltage, and means controlling the drill movements in accordance with the error voltage so as to remove material from the workpiece in accordance therewith and thereby correct for such unbalance.

10. In a balancing machine, the combination of means determining the amount of unbalance in a workpiece and developing a corresponding unbalance voltage, unbalance correcting means including a drill positioned at an initial setting proximate to the workpiece and operative to remove material therefrom, means responsive to the drill movements including a voltage source and a potentiometer adjustable by and in accordance with drill position so as to vary the output from the voltage source and develop a drill depth voltage that corresponds to drill position, means altering the unbalance voltage so that the drill depth voltage and the resulting unbalance voltage can be algebraically summed, the altering means including a voltage proportioning network comprising a series of resistive elements and biased diodes so arranged as to change the unbalance voltage by factors that are a function of both the radius of the center of gravity of the material removed and the weight of the material removed, means summing the resulting unbalance voltage and the drill depth voltage so as to develop therefrom an error voltage, and means controlling the drill movements in accordance with the error voltage so as to remove material from the workpiece in accordance therewith and thereby correct for such unbalance, and starting means connecting the altering means and the means responsive to the drill movements when a certain positional relationship exists between the drill and the workpiece, the starting means including means nulling the output from the source at the certain positional relationship.

11. In a balancing machine, the combination of means determining the amount of unbalance in a workpiece, means correcting for such unbalance, the correcting means including a movable correction device positioned proximate to the workpiece and operative to alter the mass of the workpiece, means maneuvering the correction device and the workpiece relative to each other from an initial relative setting, a source of voltage, the source being so arranged as to have the output thereof variable in accordance with different relative settings of the correction device and the workpiece, means starting operation of the correction device when a certain positional relationship exists between the correction device and the workpiece, and means nulling the output of the voltage source at the certain positional relationship.

No references cited.

WILLIAM W. DYER, JR., *Primary Examiner.*
FRANCIS S. HUSAR, *Examiner.*

UNITED STATES PATENT OFFICE
CERTIFICATE OF CORRECTION

Patent No. 3,228,264                          January 11, 1966

Philip K. Trimble

It is hereby certified that error appears in the above numbered patent requiring correction and that the said Letters Patent should read as corrected below.

Column 2, line 29, for "embodiment" read -- embodiments --; column 3, line 58, for "63b" read -- 62b --; column 6, line 74, for "to" read -- is --; column 7, line 29, for "deenergizes" read -- deenergize --; line 56, after "scheme" insert a period; column 8, line 57, after "mass" insert -- of --.

Signed and sealed this 10th day of January 1967.

(SEAL)
Attest:

ERNEST W. SWIDER                                         EDWARD J. BRENNER
Attesting Officer                                               Commissioner of Patents